United States Patent
McGrath et al.

[11] Patent Number: 5,949,147
[45] Date of Patent: Sep. 7, 1999

[54] SHORT CIRCUIT SAFETY AUDIBLE MONITOR

[75] Inventors: Michael C. McGrath, Farmington Hills; Michael A. Hedding, Canton, both of Mich.; Charles L. Robertson, Horton, Ala.

[73] Assignee: Hayes Lemmerz International, Inc., Northville, Mich.

[21] Appl. No.: 08/862,597

[22] Filed: May 23, 1997

Related U.S. Application Data

[60] Provisional application No. 60/018,315, May 24, 1996.

[51] Int. Cl.⁶ .................................................. B60T 13/74
[52] U.S. Cl. ........................ 307/10.1; 291/15; 303/124; 369/237; 701/70
[58] Field of Search ................................ 361/57, 104, 93, 361/103; 340/635, 638, 664; 307/9.1, 10.1, 10.6, 10.7, 10.8; 180/198, 15; 369/237; 701/1, 34, 36, 70, 76; 291/15; 303/2, 3, 7, 15, 122.05, 122.1, 122.14, 123, 124

[56] References Cited

U.S. PATENT DOCUMENTS

| | | | |
|---|---|---|---|
| 3,780,832 | 12/1973 | Marshall | 303/7 |
| 3,815,129 | 6/1974 | Sweany . | |
| 3,890,612 | 6/1975 | Sweany et al. . | |
| 4,057,299 | 11/1977 | Jones | 303/122.05 |
| 4,104,628 | 8/1978 | Sweany et al. . | |
| 4,290,060 | 9/1981 | Eppley | 340/638 |
| 4,554,607 | 11/1985 | Mora | 361/104 |

OTHER PUBLICATIONS

Middlebrooks, Fuse Status Indicator System, US Statuory Inveniton Registration, H248, Apr. 07, 1987.

*Primary Examiner*—Albert W. Paladini
*Attorney, Agent, or Firm*—MacMillan, Sobanski & Todd, LLC

[57] ABSTRACT

An electrical short circuit protection device for an electric trailer brake controller includes a fuse connected between the controller and the trailer brakes and an acoustic piezoelectric transducer connected across the fuse. Upon a short circuit fault developing in the trailer brakes, the fuse opens and the transducer generates an audio warning signal.

18 Claims, 4 Drawing Sheets

SHORT CIRCUIT SAFETY AUDIBLE MONITOR

CROSS REFERENCE TO RELATED APPLICATIONS

This application claims the benefit of U.S. Provisional Application Ser. No. 60/018,315, filed May 24, 1996.

BACKGROUND OF THE INVENTION

This invention relates in general to electronic controllers for electric trailer brakes and in particular to a load short circuit protection device having an audible alarm.

Towed vehicles, such as recreational and utility trailers adapted to be towed by automobiles and small trucks, are commonly provided with electric brakes. The electric brakes generally include a pair of brake shoes which, when actuated, frictionally engage a brake drum. An electromagnet is mounted on one end of a lever to actuate the brake shoes. When an electric current is applied to the electromagnet, the electromagnet is drawn against the rotating brake drum and pivots the lever to actuate the brakes. Typically, the braking force produced by the brake shoes is proportional to the electric current applied to the electromagnet. This electric current can be relatively large. For example, the brakes on a two wheeled vehicle can draw six amperes of current when actuated and the brakes on a four wheeled vehicle can draw 12 amperes of current.

The towed vehicle brakes are typically activated by an electric brake controller mounted within the towing vehicle. The simplest electric brake controller includes a switch connected between the towing vehicle power supply and the towed vehicle electric brakes. Usually a resistor is included between the switch and the brakes to limit the current supplied to the brakes. The towing vehicle operator closes the switch to activate the towed vehicle brakes. Such brake controllers can further include a plurality of switches. A current limiting resistance is associated with each switch to provide different braking intensities.

An electric brake controller also can include a variable resistor, such as a rheostat, which is connected between the towing vehicle power supply and the brake electromagnets on the towed vehicle. Such electric brake controllers are commonly referred to as electric brake actuators. The towing vehicle operator manually adjusts the variable resistor setting to vary the amount of current supplied to the brake electromagnets and thereby control the amount of braking force developed by the towed vehicle brakes.

Also know in the art are more sophisticated electric brake controllers which include an electronic circuit to automatically supply current to the brake electromagnets when the towing vehicle brakes are applied. Such electric brake controllers are commonly referred to as electronic brake controllers and typically include a sensing unit which generates a brake control signal corresponding to the desired braking effort. For example, the sensing unit can include a pendulum which is displaced from a rest position when the towing vehicle decelerates and an electronic circuit for generating a brake control signal which is proportional to the pendulum displacement. One such sensing unit is disclosed in U.S. Pat. No. 4,721,344.

Known electronic brake controllers also typically include an analog pulse width modulator. The input of the pulse width modulator is electrically connected to the sensing unit and receives the brake control signal therefrom. The pulse width modulator is responsive to the brake control signal for generating an output signal comprising a fixed frequency pulse train. The pulse width modulator varies the duty cycle of the pulse train in proportion to the magnitude of the brake control signal. Thus, the duty cycle of the pulse train corresponds to the amount of the braking effort desired.

The output of the pulse width modulator is usually coupled to an output stage which includes one or more power transistors connected between the towing vehicle power supply and the towed vehicle brake electromagnets. The power transistors act as electronic switches, being cycled between conducting and non-conducting states in accordance with the duty cycle of the output signal. One such electronic brake controller is disclosed in U.S. Pat. No. 5,620,236.

SUMMARY OF THE INVENTION

This invention relates to a load short circuit protection device having an audible alarm for protecting an electronic controller for electric trailer brakes.

The output stages of the electronic brake controllers described above are designed with robust power transistors to withstand the high currents drawn by the towed vehicle brake electromagnets. However, it is desirable to protect the output stage power transistors from excessive currents, such as may be occur if a short circuit develops in the trailer brakes.

It is known to include a current sensing resistor between the electronic brake controller and the towed vehicle brakes. The brake controller monitors the voltage across the current sensing resistor. If an excessively high current is drawn by the towed vehicle brakes, the resulting high voltage appearing across the current sensing resistor will cause the brake controller to switch the power transistors to their non-conducting state. Such a circuit is disclosed in U.S. Pat. No. 4,856,850. Another output current sensing device for protecting the brake controller is disclosed in U.S. Pat. No. 4,721,344.

Additionally, as shown in the above mentioned U.S. Pat. No. 5,620,236, it is known to include a fuse or circuit breaker between the towing vehicle power supply and the electronic controller. However, if a direct short circuit should develop in the towed vehicle brakes, the above described circuit protection may not respond quickly enough to prevent damage to the output power transistors. Accordingly, it would be desirable to provide a quick response short circuit protection for electronic brake controllers. Additionally, it would be desirable to provide an audible warning signal to alert the vehicle operator when a short circuit exists since the towed vehicle brakes would probably be inoperable.

The present invention contemplates an electrical short circuit protection device which includes a fuse having an input terminal adapted to be connected to an output terminal of a controller. The fuse also has an output terminal adapted to be connected to a vehicle electrical load. Alternately, a quick-acting circuit breaker can be substituted for the fuse. A device which generates a warning signal is connected across the fuse/circuit breaker. The device which generates a warning signal includes a piezoelectric transducer which generates an audio warning signal when a short circuit current opens the fuse or circuit breaker.

The short circuit protection device also can include a diode having an anode and a cathode, the diode being connected between the controller output terminal and the input terminal of the transducer. The diode anode is connected to the controller output terminal while the diode cathode is connected to the transducer input terminal. The short circuit protection device furthier can include a current limiting resistor connected between the transducer output terminal and the vehicle electrical load.

In the preferred embodiment, the controller is an electric brake controller and the vehicle electrical load includes electric brakes mounted upon a towed vehicle.

Alternately, the device which generates a warning signal can include an electronic switch which is operative upon the fuse/circuit breaker opening to illuminate a warning lamp which provides a visual warning signal to the vehicle operator.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
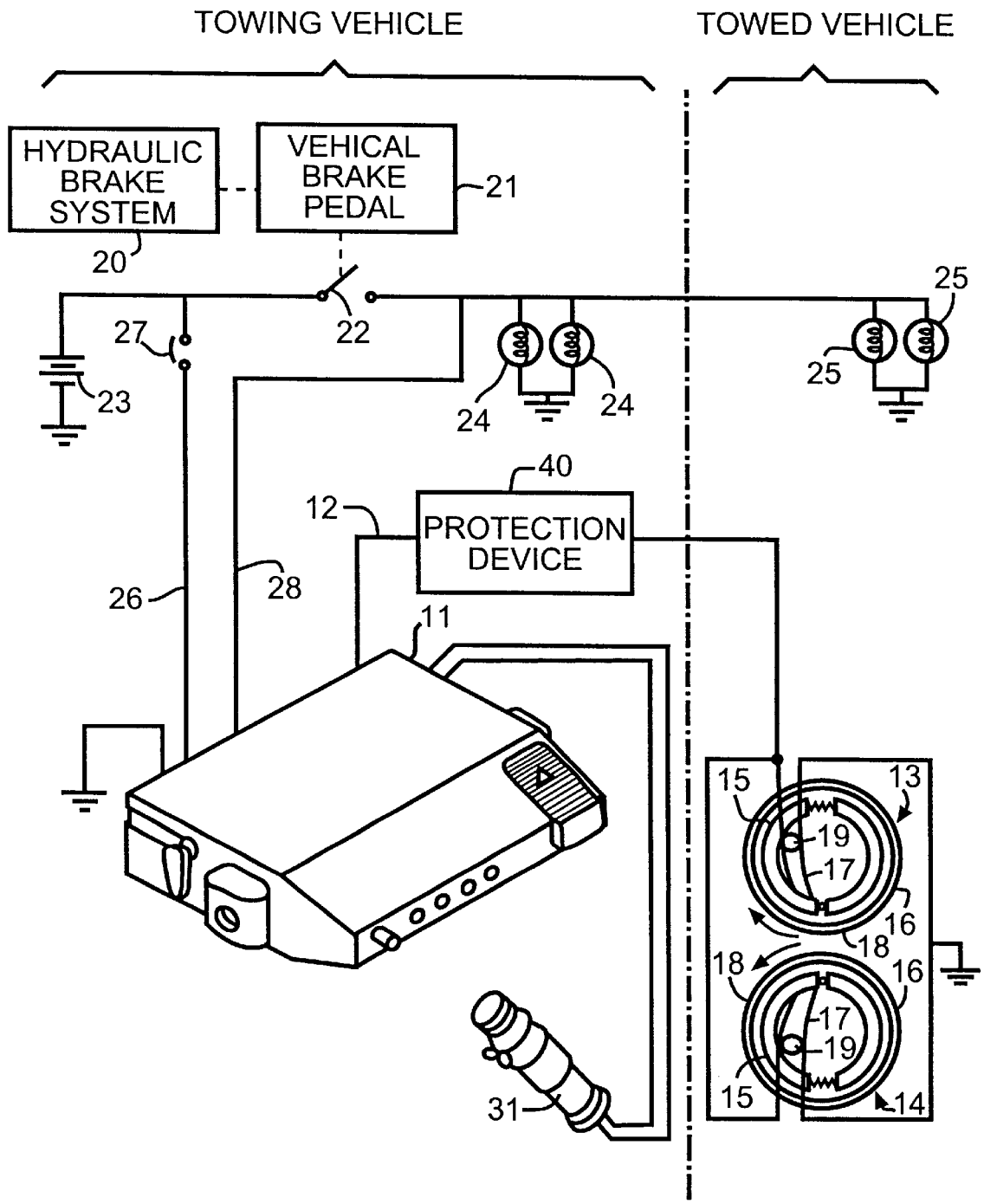
FIG. 1 is a schematic drawing illustrating an electric trailer brake system which includes an electronic brake controller in accordance with the invention.

Referring now to the drawings, there is shown in FIG. 1 a schematic diagram illustrating an electric brake system for a towed vehicle (not shown). The electric brake system, which is shown generally at 10, includes an electronic brake controller 11. When actuated, the controller 11 functions to supply an electric current through line 12 to energize electric brakes 13 and 14 which are mounted upon a towed vehicle (not shown).

The electric brakes 13 and 14 each include a pair of brake shoes 15 and 16 which, when actuated by a lever 17, are expanded into contact with a brake drum 18 for braking the wheels of the towed vehicle. A separate electromagnet 19 is mounted upon the end of each of the brake actuating levers 17. Each electromagnet 19 is positioned to abut the generally flat side of the brake drum 18. As an electric current is passed through each of the electromagnets 19, the electromagnets 19 are drawn into contact with the brake drums 18 and the resulting drag pivots the levers 17 to engage the brake shoes 15 and 16 in a conventional manner.

The towing vehicle typically includes a conventional hydraulic brake system 20 which is actuated when a brake pedal 21 is depressed by the towing vehicle operator. The brake pedal 21 is coupled to a brake light switch 22.

When the brake pedal 21 is depressed, the brake light switch 22 is closed and power from a towing vehicle power supply 23, shown as a storage battery in FIG. 1, is supplied to one or more towing vehicle brake lights 24 and one or more towed vehicle brake lights 25. The vehicle power supply 23 also is connected by a first line 26 through a circuit breaker 27 to the controller 11. Thus, power is continuously supplied to the controller 11 though the first line 26. A second line 28 connects the brake light side of the brake light switch 22 to the controller.

The second line 28 functions to trigger the brake controller 11 when the brake light switch 22 is closed.

The brake controller 11 is normally operated in an automatic mode wherein the towed vehicle brakes 13 and 14 are automatically actuated by the controller 11 when the towing vehicle brakes are actuated. In some instances, it may desirable to actuate only the towed vehicle brakes 13 and 14. Accordingly, the controller includes a first manual control switch 30 mounted upon the controller housing and second manual remote manual control switch 31 which may be held by the towing vehicle operator. Depressing either of the manual control switches 30 or 31 will actuate the towed vehicle brakes 13 and 14 with the braking effort being proportional to the amount of depression.

The present invention contemplates a short circuit protection device 40 which is connected in the line 12 between the controller 11 and the trailer brake electromagnets 19. In the preferred embodiment, the protection device 40 is mounted under the towing vehicle dashboard adjacent to the controller 11.

Figure 2A:
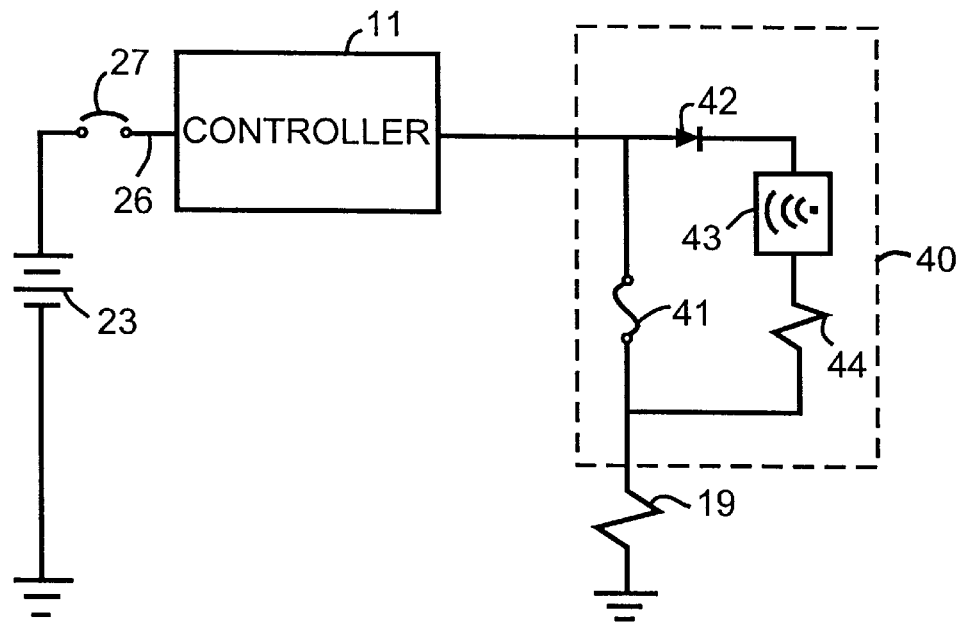
FIG. 2 is a schematic drawing of a load short circuit protection device which is included in the circuit shown in FIG. 1.
Figure 2B:
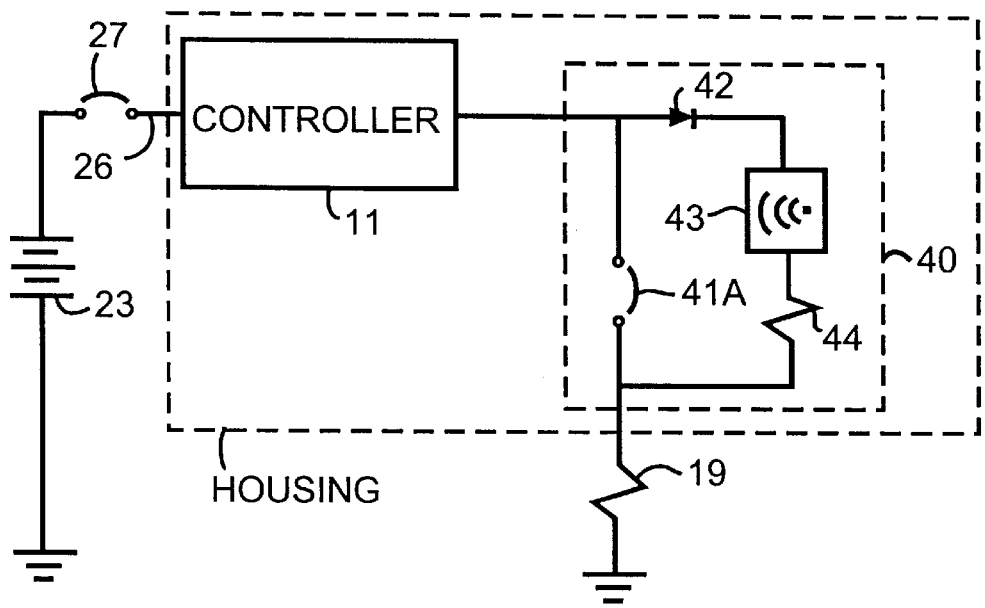

A schematic diagram of the protection device 40 is shown in FIG. 2. Components in FIG. 2 which are similar to components shown in FIG. 1 have the same numerical designators. For simplicity, not all the components shown in FIG. 1 have been included in FIG. 2. The protection device 40 is connected between the electronic brake controller 11 and the towed vehicle brake electromagnets 19, which are shown as a load resistance in FIG. 2. While an electronic brake controller is illustrated in FIG. 2, it will be appreciated that the invention also can be practiced with an electric brake actuator or switch (not shown).

In the preferred embodiment, the protection device 40 includes a fuse 41 connected between the output of the brake controller 11 and the brake electromagnets 19. Alternately, a quick acting circuit breaker 41A can be used instead of the fuse 41. In the preferred embodiment, the device 40 farther includes a diode 42 having an anode connected to the output of the controller 11 and a cathode connected to a voltage terminal of a piezoelectric audible alarm 43. The alarm 43 has a ground terminal which, in the preferred embodiment, is connected though a current limiting resistor 44 to the brake electromagnets 19.

The piezoelectric audible alarm 43 is a commercially available device which has been used in different applications requiring an audible warning signal, such as fire and smoke detectors and medical monitoring equipment. The alarm 40 includes a piezoelectric transducer (not shown) having a disc-shaped piezoelectric element mounted between two disc-shaped electrodes. When a voltage is applied across the electrodes, the piezoelectric element cyclically expands and contracts. The thickness and diameters of the element and the electrodes are selected to obtain a natural mechanical vibrational frequency in the mid-audio range.

In the preferred embodiment, an alarm 43 available from Mallory Electronics is used. More specifically, a Model Number PK-21N30W pulse tone-wire type piezo indicator is mounted in the protection device 40. The PK-21N30W indicator operates on a voltage within the range of 1.5 to 30 volts. Thus, the indicator is compatible with typical vehicle power supply voltage levels. Upon activation, the indicator will produce a constant audible tone of approximately three KHz which has a sound pressure level of 80 dB. Alternately, a piezo indicator which produces a fast or slow pulsed signal can be substituted for the PK-21N30W device.

The diode 42 is included in the protection device 40 to protect the alarm 43 from a potential reverse current flow when the magnetic field generated by the brake electromagnets 19 collapses. Similarly, the current limiting resistor 44 is included to protect the alarm 43 from a potential high current generated when the magnetic field collapses or from an excessive short circuit current. However, it will be appreciated that the invention can be practiced without the diode 42 or the current limiting resistance 44.

The operation of the protection device 40 will now be explained. If a short circuit should develop in the towed vehicle brakes, the fuse/circuit breaker 41 will immediately open to interrupt the flow of current through the controller 11. This protects the controller output power transistors from potential damage. With the fuse/circuit breaker 41 open, the controller output voltage now appears across the alarm 43 and the resistor 44. The voltage causes the alarm to be actuated, providing an immediate audible warning to the towing vehicle operator that the towed vehicle brakes are non-functional.

While the preferred embodiment of the invention has been described and illustrated with the protection device 40 being separate from the controller 11, it will be appreciated that the device 40 can be included within the controller 11.

Figure 3A:
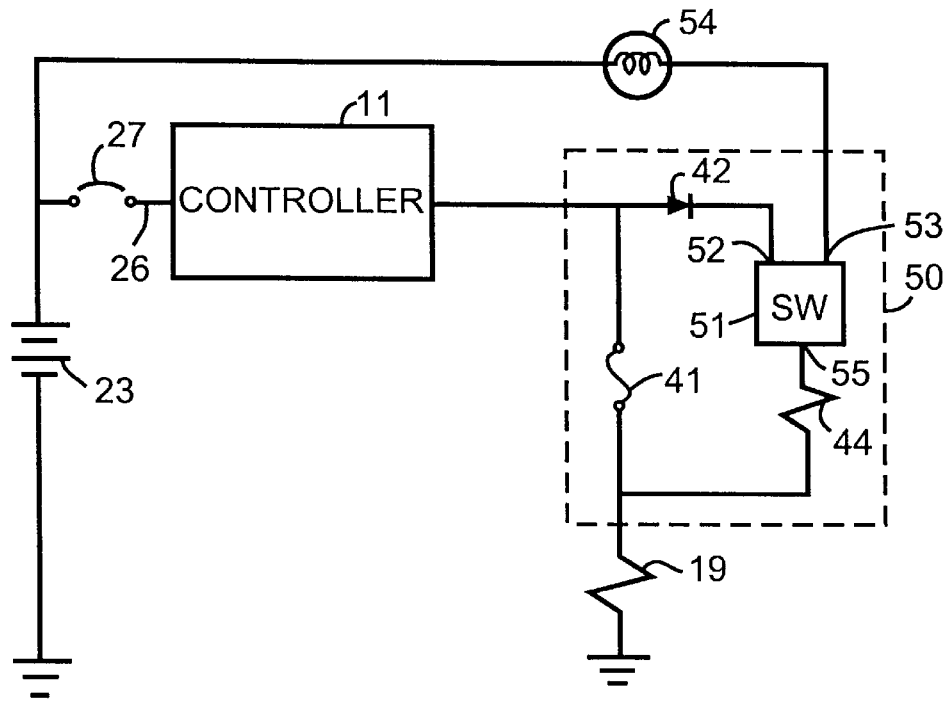
FIG. 3 is a schematic drawing of an alternate embodiment of the load short circuit protection device shown in FIG. 2.
Figure 3B:
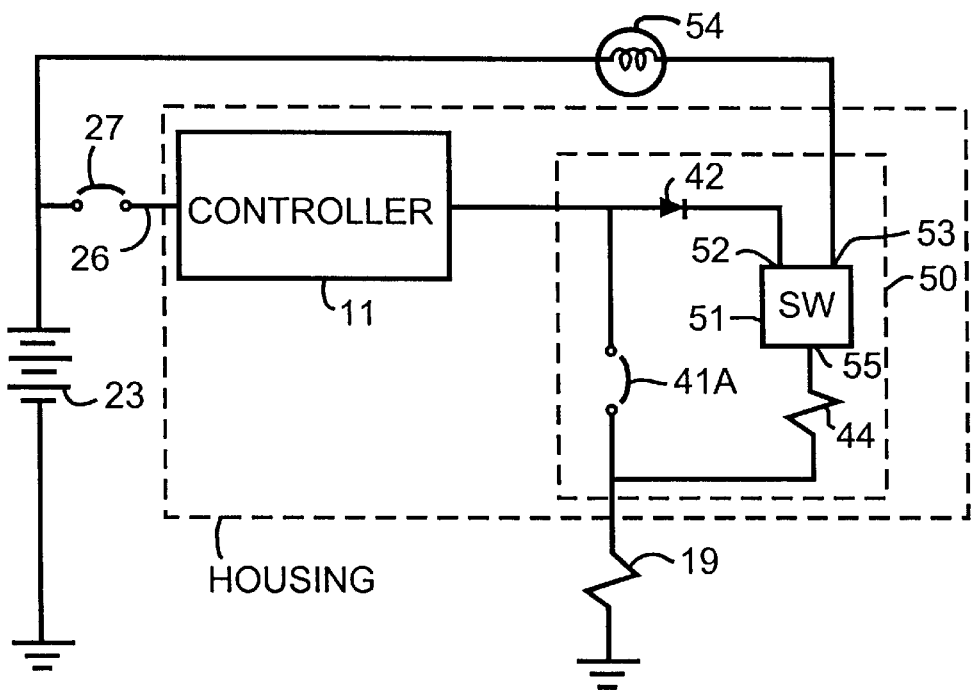

An alternate embodiment of the protection device 50 is illustrated in FIG. 3. Components in FIG. 3 which are similar to components shown in FIG. 2 have the same numerical designators. The protection device 50 includes a conventional electronic switch 51 having a first input terminal 52 connected through the diode 42 to the output terminal of the brake controller 11. The switch 51 has a second input terminal 53 which is connected through aL warning lamp 54 to the towing vehicle power supply 23. In the preferred embodiment, the warning lamp 54 is mounted upon the towing vehicle dashboard. The switch 51 also has a ground terminal 55 connected through the current limiting resistor 44 to the brake electromagnets 19. Similar to the circuit shown in FIG. 2, the diode 42 and current limiting resistor 44 shown in FIG. 3 are optional.

The operation of the protection device 50 will now be explained. The electronic switch 51 is of a conventional design and includes a power transistor (not shown) connected between the lamp 54 and the brake electromagnets 19. When the fuse/circuit breaker 41 is closed, no voltage appears between the first input terminal 52 and the ground 55 of the switch 51 and the switch power transistor is in a non-conducting state. Upon a voltage being applied across the first input terminal and the ground 55, the switch power transistor is switched to a conducting state. Thus, if a short circuit should develop in the towed vehicle brakes, the fuse/circuit breaker 41 will open, causing the output voltage of the controller 11 to be applied to the first terminal 52 of the electronic switch 51. Accordingly, the power transistor in the switch 51 will change to its conducting state, causing the warning lamp 54 to be illuminated. The warning lamp provides a visual warning to the towed vehicle operator. Depending upon the electronic switch 51 selected, the warning lamp can be continuously illuminated or can flash at a predetermined rate. Similar to the acoustic protection device 40 described above, the visual protection device 50 can be included as a portion of the brake controller 11.

Figure 4A:
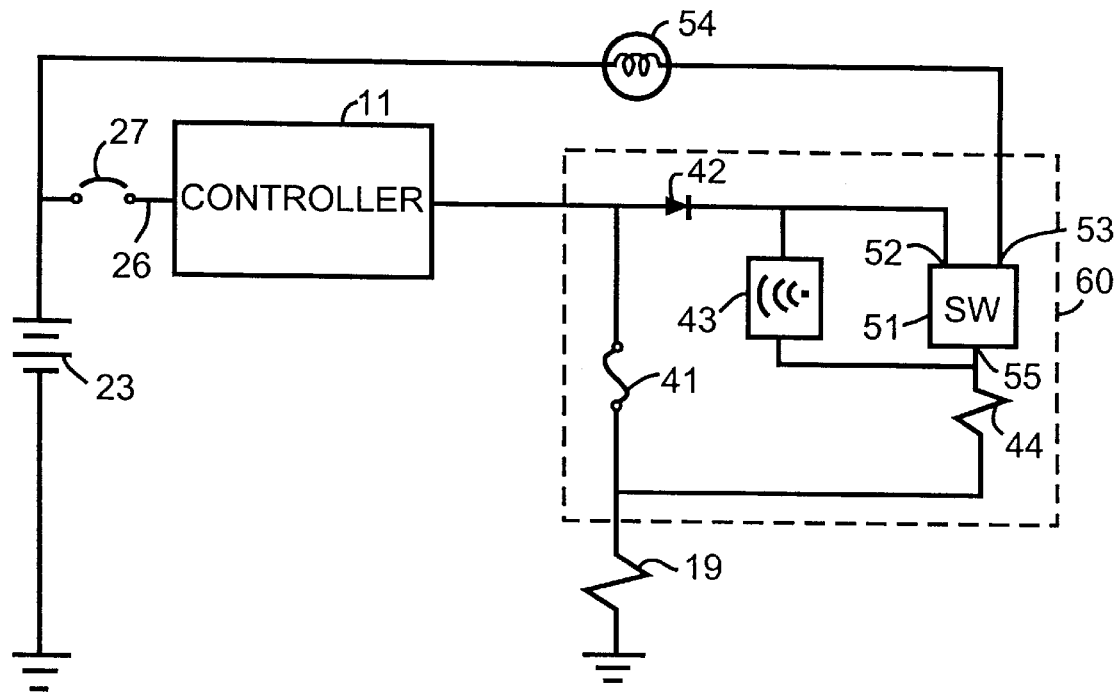
FIG. 4 is a schematic drawing of another alternate embodiment of the load short circuit protection device shown in FIG. 2.
Figure 4B:
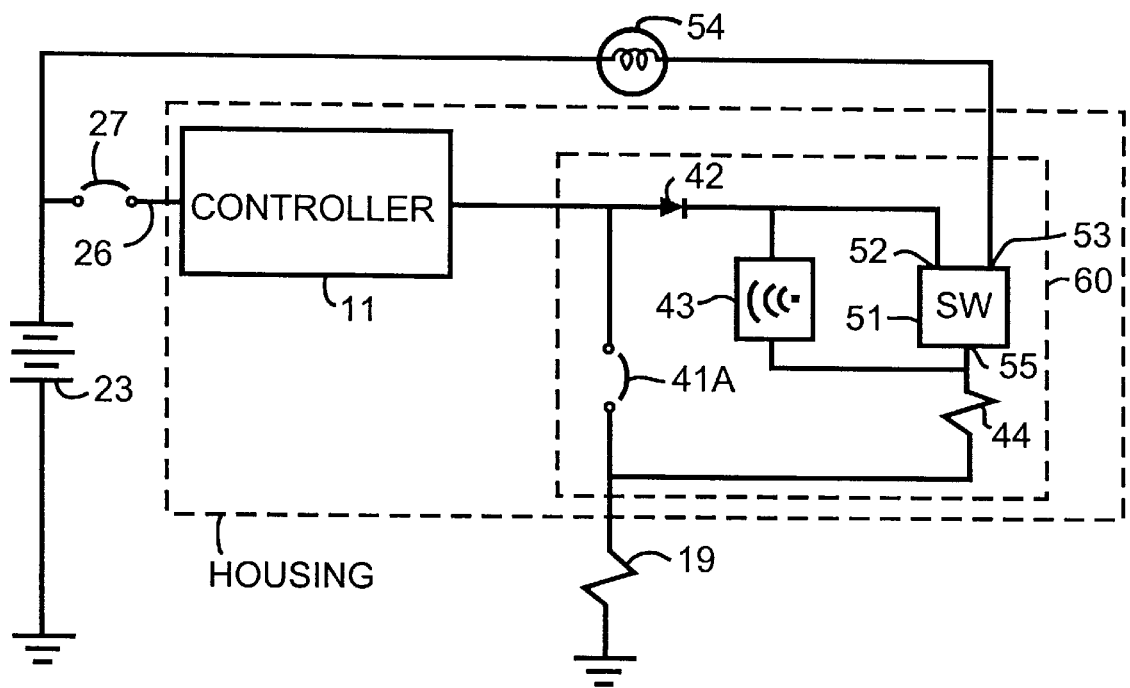

Another alternate embodiment of the invention is shown generally at 60 in FIG. 4. Components in FIG. 4 which are similar to components shown in FIGS. 2 and 3 have the same numerical designators. The protection device 60 includes both a piezoelectric audible alarm 43 and an electronic switch 53 for actuating a warning lamp 54. Upon a short circuit developing in the towed vehicle brakes, both an acoustic and visual warning alarm will be provided by the device 60 to the towing vehicle operator.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, the device can be connected between other vehicle electrical control systems and the associated load to warn the vehicle operator of a short circuit fault developing in the load. Additionally, a feature shown in one figure can be practiced in the other figures. For example, the quick acting circuit breaker 41A shown in FIG. 2B can be substituted for the fuse 41 included in FIG. 2A while the fuse 41 shown in FIG. 2A can be substituted for the quick acting circuit breaker 41A included in FIG. 2B.

What is claimed is:

1. An electrical short circuit protection device for a controller for at least one vehicle electric wheel brake, the electrical short circuit protection device comprising:

a vehicle power supply;

an electric wheel brake controller having a short circuit protection device, said controller also including an input terminal and an output terminal said input terminal connected to said power supply;

current interrupting device which is separate from the brake controller short circuit protection device, said current interrupting device having an input terminal and an output terminal, said current interrupting device input terminal being electrically coupled to said electric wheel brake controller output terminal and said current interrupting device output terminal being electrically coupled to the vehicle electric wheel brake, said current interrupting device being operative to interrupt an excessive flow of electric current from said electric brake controller to the vehicle electric wheel brake; and a device which generates a warning signal electrically connected across said current interrupting device.

2. An electrical short circuit protection device according to claim 1 wherein said current interrupting device is one of a fuse and a quick-acting circuit breaker.

3. An electrical short circuit protection device according to claim 2 wherein said device which generates a warning signal includes an electronic switch which is operative upon said current interrung device being actuated to illuminate a warning lamp.

4. An electrical short circuit protection device according to claim 3 wherein said device which generates a warning signal includes a piezoelectric transducer which generates an audio warning signal.

5. An electrical short circuit protec tion device according to claim 4 further including a diode having an anode and a cathode, said diode being connected between said controller output terminal and said input terminal of said transducer with said anode connected to said controller output terminal and said cathode connected to said piezoelectric transducer input terminal.

6. An electrical short circuit protection device according to claim 5 further including a current limiting resistor connected between said piezoelectric transducer output terminal and the vehicle electrical load.

7. An electrical short circuit protection device according to claim 6 wherein said electric brake controller is mounted upon a first vehicle and the electric wheel brake is mounted upon a second vehicle which is towed by said first vehicle.

8. An electrical short circuit protection device according to claim 7 wherein said electric brake controller is disposed within a housing, said housing also enclosing said current interrupting device and said piezoelectric transducer.

9. An electrical short circuit protection device according to claim 7 further including an electronic switch connected across said transducer, said electronic switch being operative upon said current interrupting device being actuated to illuminate a warning lamp.

10. An electrical short circuit protection device for an electric wheel brake controller for at least one vehicle electric wheel brake, the electric wheel brake controller including a short circuit protection device, the short circuit protection device comprising:

a current interrupting device which is separate from the electric wheel brake controller short circuit protection device, said current interrupting device having an input terminal adapted to be connected to an output terminal of the electric wheel brake controller, said current interrupting device also having an output terminal adapted to be connected to the vehicle electric wheel brake, said current interrupting device being operative to interrupt an excessive flow of electric current from the electric brake controller to the vehicle electric wheel brake; and a device which generates a warning signal connected across said current interrupting device.

11. An electrical short circuit protection device according to claim 10 wherein said device which generates a warning signal includes an electronic switch which is operative upon said current interrupting device being actuated to illuminate a warning lamp.

12. An electrical short circuit protection device according to claim 10 wherein said current interrupting device is one of a fuse and a quick-acting circuit breaker.

13. An electrical short circuit protection device according to claim 12 wherein said device which generates a warning signal includes a piezoelectric transducer which generates an audio warning signal.

14. An electrical short circuit protection device according to claim 13 further including a diode having an anode and a cathode, said diode being connected between said controller output terminal and said input terminal of said transducer with said anode connected to said controller output terminal and said cathode connected to said piezoelectric transducer input terminal.

15. An electrical short circuit protection device according to claim 14 further including a current limiting resistor connected between said piezoelectric transducer output terminal and said electrical load.

16. An electrical short circuit protection device according to claim 15 wherein the electric brake controller is mounted upon a first vehicle and the electric wheel brake is mounted upon a second vehicle which is towed by said first vehicle.

17. An electrical short circuit protection device according to claim 16 wherein said electric brake controller is disposed within a housing, said housing also enclosing said current interrupting device and said piezoelectric transducer.

18. An electrical short circuit protection device according to claim 16 further including an electronic switch connected across said transducer, said electronic switch being operative upon said current interrupting device being actuated to illuminate a warning lamp.

* * * * *